United States Patent

Derner et al.

[11] 4,160,608
[45] Jul. 10, 1979

[54] PRELOADING NUT FOR WEDGE SLEEVE

[75] Inventors: William J. Derner; Connor E. Price, both of Indianapolis, Ind.

[73] Assignee: FMC Corporation, San Jose, Calif.

[21] Appl. No.: 874,962

[22] Filed: Feb. 3, 1978

[51] Int. Cl.² ............................................. F16B 2/14
[52] U.S. Cl. ................................... 403/370; 403/342; 308/236
[58] Field of Search ............... 403/370, 371, 368, 2, 403/342; 308/236; 285/342, 382.7

[56] References Cited

U.S. PATENT DOCUMENTS

| | | | |
|---|---|---|---|
| 718,376 | 1/1903 | O'Reilly | 308/236 |
| 1,323,655 | 12/1919 | Strandell | 285/382.7 X |
| 1,739,740 | 12/1929 | Stoeltzlen | 403/370 X |
| 2,496,402 | 2/1950 | McVeigh et al. | 285/342 X |
| 2,573,928 | 11/1951 | Peter | 403/368 X |
| 3,441,297 | 4/1969 | Koski | 285/342 |

FOREIGN PATENT DOCUMENTS 538058  3/1922  France ..................... 308/236

Primary Examiner—Andrew V. Kundrat
Attorney, Agent, or Firm—J. F. Verhoeven

[57] ABSTRACT

A nut is provided for preloading a sleeve which is wedged between a tubular member and a shaft. The nut, which is threadedly received on the tubular member, has a resilient, radially inwardly extending portion to engage the end of the wedge sleeve. When the nut is tightened on the tubular member, the inwardly extending portion of the nut is deflected to produce a stress-created force on the wedge sleeve, continuously urging the wedge sleeve toward a tightening position between the tubular member and the shaft.

3 Claims, 5 Drawing Figures

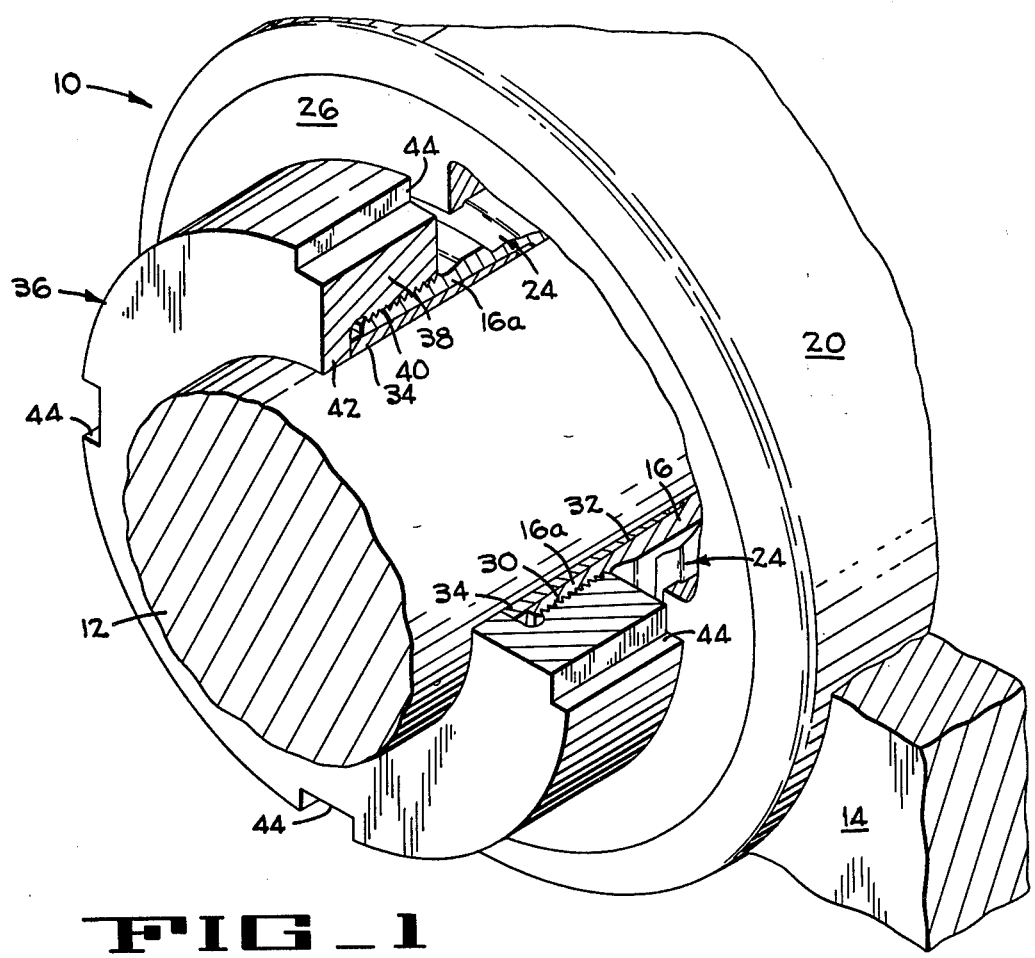
FIG_1
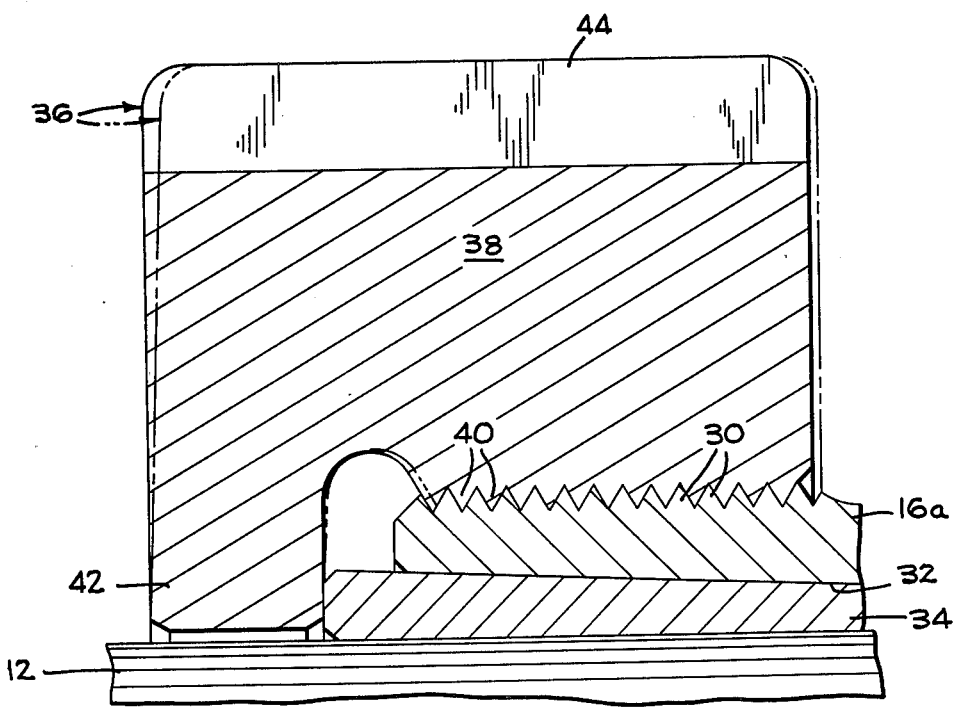
FIG_3

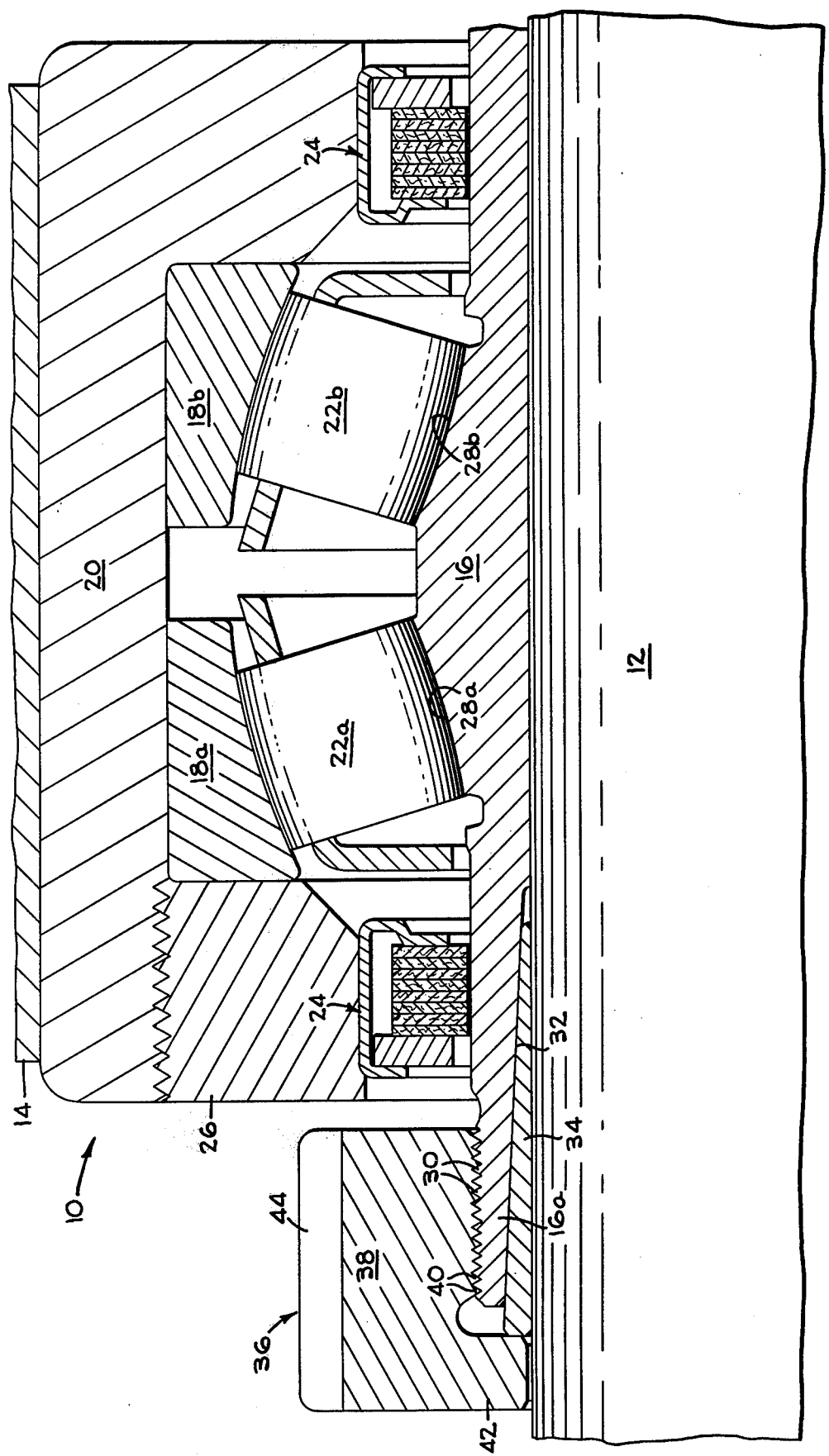
FIG_2

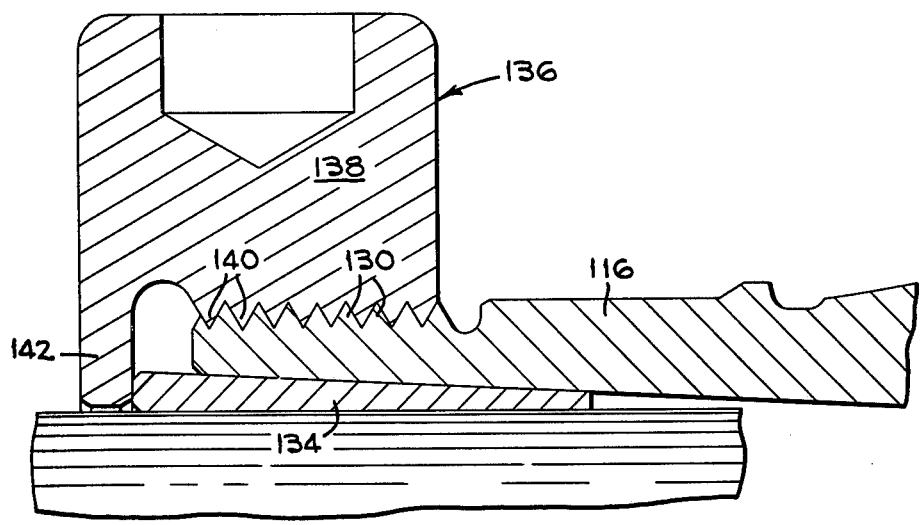
FIG_4
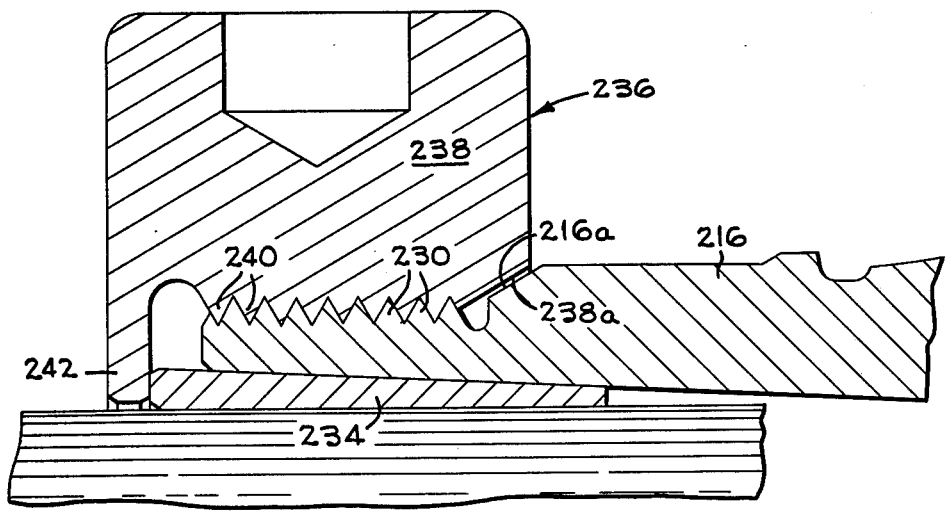
FIG_5

PRELOADING NUT FOR WEDGE SLEEVE

BACKGROUND OF THE INVENTION

1. Field of the Invention

This application relates to mechanism for securing machine elements such as bearings to shafts.

2. Description of the Prior Art

There are many mechanisms for securing machine elements, such as bearings, to shafts. Frequently, these mechanisms employ a wedge sleeve for insertion between the shaft and the machine element to be secured thereto.

In one type of wedge sleeve clamping mechanism, as shown, for example, in the U.S. patent to O'Reilly No. 718,376, a wedge sleeve is received between a threaded tubular member (on which the bearing is mounted) and the shaft to which the bearing is to be secured. A first nut is threadedly received on the tubular member, and a flange on the first nut extends outwardly over the wedge sleeve. The flange has internal threads which receive a second nut extending from the flange of the first nut behind the end of the wedge sleeve. When the first nut is tightened on the tubular member, the second nut engages the wedge sleeve to force the wedge sleeve under the tubular member.

SUMMARY OF THE INVENTION

There is provided in the present invention, a nut for receipt on a tubular member, such as an inner race bearing member or a tubular member on which a bearing is mounted. The nut extends over the end of a wedge sleeve which is received between the tubular member and the shaft on which the tubular member is received. A portion of the nut extends radially inwardly behind the end of the wedge sleeve to force the wedge sleeve under the tubular member when the nut is tightened on the tubular member.

If wear occurs between the shaft and the wedge sleeve, or between the wedge sleeve and the tubular member, looseness of the tubular member on the shaft results even if a nut or a nut portion holds the wedge sleeve between the tubular member and the shaft. Unless the nut is periodically tightened, the looseness can become significant over an extended period, particularly under heavy duty use.

I have provided means with my improved wedge retaining nut to hold the wedge sleeve tight under the tubular member over an extended period without periodic maintenance. I have accomplished this by providing on my nut a radially inwardly extending wedge retaining portion which is integral with, or rigidly connected with, the body of the nut. This portion, although made of steel and of sufficient thickness for the necessary strength, is resilient and will deflect under force as does a leaf spring or a conical, steel Belleville washer. When my nut is tightened on the tubular member with the wedge retaining portion engaged with the end of the sleeve, the wedge retaining resilient portion is deflected to preload the sleeve (that is, to exert a continuous force on the sleeve) and urge it tightly between the tubular member and the shaft. If wear occurs between the wedge sleeve and the tubular member or the shaft, the wedge sleeve is automatically urged farther in between the tubular member and the shaft by the deflected, resilient, wedge sleeve retaining portion of my nut.

Another feature of my nut is the radial span of the nut which limits any radially outward expansion of the tubular member. Thus, my nut, at the same time it is urging the wedge sleeve tightly under the tubular member, is resisting any outward expansion of the tubular member from the wedge action to hold the tubular member tightly to the shaft. With this construction, the clamping force created by the wedge is not diminished by expansion of the tubular member.

In one embodiment of the invention, an additional safeguard is provided to prevent excessive outward expansion of the tubular member from the wedging action of the wedge sleeve. In this embodiment, I have provided a radially inwardly extending portion with a reduced thickness so that it will deflect to its elastic limit and undergo a permanent deformation before the wedge sleeve expands the tubular member a dangerous amount.

In yet another embodiment, a more positive limit on the expansion of the tubular member is provided. A tapered surface on the nut engages a tapered surface on the tubular member to prevent excessive expansion of the tube by the wedge sleeve.

It is therefore one object of the present invention to provide a wedge sleeve retaining nut which continuously urges the wedge sleeve in a tightening direction.

It is another object of the present invention to provide a wedge sleeve retaining nut for a tubular member which continuously urges the wedge sleeve in a tightening direction under the tubular member while, at the same time, resisting outward expansion of the tubular member.

It is yet another object of the present invention to provide a portion on the nut which will deform to stop advance of the wedge sleeve in a tightening direction.

It is still another object of the present invention to provide means on the nut to effect a positive termination of expansion of the tubular member.

BRIEF DESCRIPTION OF THE DRAWINGS

FIG. 1 is a view in perspective of the mechanism of the present invention, with a portion thereof cut away for clarity.

FIG. 2 is a side view in cross-section of the mechanism of FIG. 1 as used in locking a bearing to the shaft.

FIG. 3 is an enlarged view of a portion of FIG. 2.

FIG. 4 is a view taken as the view of FIG. 3 but showing a different embodiment of the invention.

FIG. 5 is a view taken as the view of FIG. 3 but showing yet another embodiment of the invention.

DESCRIPTION OF THE PREFERRED EMBODIMENT

There is shown in FIGS. 1 and 2, a bearing 10 and a shaft 12. For purposes of illustration, let it be assumed that the shaft 12 is supported by the bearing 10, which is mounted to a fixed frame 14, for rotation of the shaft relative to said frame.

The bearing shown by way of illustration has an inner race member 16 and two outer race members 18a, 18b which are received in a housing 20. Two rows 22a, 22b of rollers are received between the inner race member and the outer race members, respectively. Seals 24 are received between the inner race member and the housing on one side, and between the inner race member and a retaining ring 26 on the other side. The housing is secured in the frame 14.

The inner race member, which is a tubular member with races 28a, 28b on its outer surface to receive the rows of rollers, respectively, has a portion 16a which extends axially beyond the bearing on at least one side. The portion 16a has external threads 30, and has a wedge-shaped groove 32 cut in its inner surface to receive a wedge sleeve 34. The sleeve, which is made of resilient steel, has a longitudinal slit (not shown) extending its entire length to permit the sleeve to expand or contract for a snug but sliding fit on shaft 12. The sleeve 34 serves to tighten the inner race 16 of the bearing on the shaft as the sleeve is forced between the inner race 16 and the shaft 12.

A nut 36 has a body 38 with internal threads 40 to mesh with threads 30 on the inner race portion 16a. The nut has a portion 42 which extends radially inwardly beyond the end of inner race member 16 and engages the end of sleeve 34. The nut has slots 44 to receive a wrench for tightening and loosening, and when the nut is tightened (for axial movement toward the bearing), the radially inwardly extending portion 42 pushes the wedge 34 into groove 32 to tighten the inner race member 16 on the shaft.

It will be noted that the body 38 of the nut is of substantially radial span to resist expansion of the tubular inner race member 16 as the wedge 34 is pushed between the inner race member and the shaft. Preferably, the radial span (i.e., wall thickness) of the nut will be sufficiently greater than the radial span (i.e., wall thickness) of the tubular member to insure a nut sigificantly stiffer than the tubular member, whereby the nut will have a spring rate at least twice that of the tubular member in radial loading.

The radially inwardly extending nut portion 42 is shown as integral with the body portion 38 and, therefore, is rigidly connected with the body portion. The portion 42 can also be connected with the body portion by welding, or by other means which will rigidly secure the portion 42 to the body 38. This is important because after the wedge 34 is pushed into groove 32 as far as it will go, the nut (which, at this time, is in the position shown in solid lines in FIG. 3) is further tightened (that is, turned for movement toward the bearing) to the position shown in dotted lines. The nut is made of steel, and the radially inwardly extending portion 42, which in the illustrated example is in the form of a diaphragm, is deflected since the inward end of the portion 42 is held by the wedge. The diaphragm 42 is resilient, so that a large stress develops from the deflection of the diaphragm. The stress in the diaphragm creates a continuous force, or pre-load, on the end of the wedge sleeve 34, urging the sleeve inwardly into the groove 32. If the wedge sleeve wears from contact with the inner race member 16 or the shaft 12, the wedge sleeve is automatically shifted inwardly by the diaphragm 42 to retain the inner race member tightly to the shaft.

It will be understood that although the preferred form for the inwardly radially extending portion 42 is a diaphragm, this portion of the nut can be constructed in the form of fingers or other suitable shapes to pre-load the wedge sleeve.

In some instances, it is desirable, for ease of manufacture, to utilize threaded sections of nut and tubular member which are not close fitting and, therefore, an initial expansion of the tubular member can occur when the wedge sleeve is driven between the nut and tubular member by the nut. The nut 136 shown in the embodiment of FIG. 4 is designed to prevent the destructive expansion of the tubular member when the threads on the nut and tubular member are not of a close fit.

The nut 136 has a body portion 138 which has internal threads 140 for engagement with the threads 130 of tubular member 116. The nut 136 has an inwardly extending nut portion 142 which can be either integral with the body portion 138 (as shown) or rigidly connected to the body portion of the nut (as by welding). In this embodiment, the inwardly extending nut portion 142 has a reduced thickness so that on rotation of the nut to force the wedge sleeve 134 under the tubular member, the portion 142 will reach its elastic limit (and deform permanently) before the wedge sleeve has expanded the tubular member to destruction. Thereafter, further tightening of the nut cannot insert the wedge sleeve further and damage the tubular member.

In the embodiment of FIG. 5, another form of the nut is shown. In this embodiment, the nut 236 has a body 238 and an inwardly extending nut portion 242. The nut portion 242, which can be similar to either the nut portion 42 of FIG. 2 or the nut portion 142 of FIG. 4, engages the wedge sleeve 234 and advances the sleeve between the nut and the tubular member 216 as the nut is tightened on the tubular member. In this embodiment, the tubular member 216 has a tapered surface 216a thereon facing the nut. The nut body 238 has a complementary tapered surface 238a which engages the tapered surface 216a when the nut is tightened on the tubular member. Thus, if the threads 230 on the tubular member 216 form a loose fit with the threads 240 of the nut, the nut body will nevertheless make positive engagement with the tubular member to prevent failure of the tubular member from expansion thereof by the wedge sleeve 234.

Although the best mode contemplated for carrying out the present invention has been herein shown and described, it will be apparent that modification and variation may be made without departing from what is regarded to be the subject matter of the invention.

What is claimed is:

1. In apparatus to mount a tubular member on a shaft comprising a wedge sleeve received between said tubular member and said shaft, a nut received on said tubular member and in threaded engagement therewith, said nut having a radially inwardly extending resilient member rigidly connected thereto to engage the outer end of the wedge sleeve as the nut is advanced and to advance the wedge sleeve between the tubular member and the shaft, the improvement wherein said tubular member has a tapered surface facing said nut and said nut has a complementary tapered surface to engage and overlay the tapered surface on the tubular member when the nut is tightened on the tubular member to impose a positive limit to expansion of the tubular member by the wedge sleeve.

2. The apparatus of claim 1 wherein said tubular member is the inner race of a bearing.

3. In apparatus to mount a tubular member on a shaft comprising a wedge sleeve received between said tubular member and said shaft, a nut received on said tubular member and in threaded engagement therewith, said nut having a radially inwardly extending resilient member rigidly connected thereto to engage the outer end of the wedge sleeve as the nut is advanced and to advance the wedge sleeve between the tubular member and the shaft, the improvement wherein said tubular member has a tapered annular surface facing upwardly and outwardly toward the nut, and said nut has a complementary tapered annular surface facing downwardly and inwardly toward the tubular member, said tapered surface on the nut engaging and overlaying said tapered surface on the tubular member to impose an increasing radial inward force on the tubular member as the nut is tightened on the tubular member to prevent expansion of the tubular member by the wedge sleeve.

* * * * *